US007024325B2

(12) United States Patent
Orita et al.

(10) Patent No.: US 7,024,325 B2
(45) **Date of Patent: *Apr. 4, 2006**

(54) TIME CALIBRATION METHOD FOR SECURITY SYSTEM USING SENSORS

(75) Inventors: Kouji Orita, Utsunomiya (JP); Takehiro Orita, Utsunomiya (JP); Kimito Kuriuchi, Utsunomiya (JP)

(73) Assignee: Nihondensikougaku Co., Ltd., (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/289,396

(22) Filed: Nov. 7, 2002

(65) Prior Publication Data

US 2003/0105602 A1 Jun. 5, 2003

(30) Foreign Application Priority Data

Nov. 9, 2001 (JP) ............................ 2001-344304

(51) Int. Cl.
*G01D 18/00* (2006.01)

(52) U.S. Cl. ........................................ 702/89; 702/116

(58) Field of Classification Search .................. 702/89, 702/85, 116; 700/9, 276; 340/426.19, 506, 340/508

See application file for complete search history.

(56) References Cited

U.S. PATENT DOCUMENTS 5,374,936 A * 12/1994 Feng .......................... 342/457
5,801,940 A * 9/1998 Russ et al. ...................... 700/9
6,789,182 B1 * 9/2004 Brothers et al. .............. 712/30

FOREIGN PATENT DOCUMENTS

JP 10036016 * 2/1998

* cited by examiner

*Primary Examiner*—Bryan Bui
(74) *Attorney, Agent, or Firm*—Connolly, Bove, Lodge & Hutz LLP

(57) ABSTRACT

Among multiple surveillance devices for mechanical security monitoring provided in a security system using sensors at least one of the multiple surveillance devices is equipped with a receiver for receiving standard time data and the standard time data received by the receiver is sent over a distribution line to required surveillance devices not equipped with receivers. This enables highly accurate time calibration among the multiple surveillance devices for mechanical security monitoring to be efficiently achieved using a power-line carrier (PLC) technology and, as such, allows sharing of accurate time data among the surveillance devices.

7 Claims, 4 Drawing Sheets

TIME CALIBRATION METHOD FOR SECURITY SYSTEM USING SENSORS

BACKGROUND OF THE INVENTION

1. Field of the Invention

This invention relates to a time calibration method for a security system using sensors that enables multiple devices constituting the security system to share accurate time data.

2. Background Art

Nowadays, security surveillance systems for monitoring security zones demarcated in shops, stores, financial institutions, offices and other such locations are ubiquitous. In the typical system, the monitored site is equipped with suitable window sensors, door sensors, glass shatter sensors, infrared (body heat) sensors and/or various other sensing devices for detecting the intrusion of unauthorized persons and with means responsive to the outputs of these sensors for sending specified security information to a security monitoring center via a telephone line or the like. The security surveillance center uses the security information to monitor intrusion of unauthorized persons.

Japanese Unexamined Patent Publication No. 1-131997, for example, teaches a security surveillance system of this type that is equipped with a time data generator and a memory for storing sensor operation data in association with time data so as to facilitate later analysis of the intruder's entry and escape routes by recreating the signals output by the sensors at the time of the incident.

Although the time data generator is usually a comparatively accurate instrument utilizing a crystal oscillator, its accuracy is nevertheless limited to a monthly deviation of several seconds to several tens of seconds. Unless appropriately calibrated, therefore, errors measured in seconds will arise between the time data associated with the sensor operation data and the time data associated with security surveillance center data and/or the time data of the different surveillance devices installed in the same security zone.

When such a situation arises in which the various devices making up the security surveillance center do not share identical time data, analysis of the operation data of the intrusion sensors installed in the security zone is liable not to provide adequate information on the intruder's entry route and/or escape route because only a rough comparison can be made between the intrusion sensor operation data and the time data associated with the security surveillance center data.

Security surveillance systems of the type under discussion are often installed in association with an automatic business hour (opening/closing time) system. This system should desirably be highly time-accurate, particularly when business hours are prescribed by law as is sometimes the case with financial institutions. When only crystal oscillator clocks are used, the time error eventually accumulates to the point where accurate control of business hours becomes impossible.

Moreover, when the zone under surveillance is extensive, as in the case of a large retail outlet or factory, multiple security control units are installed in the same building in order to accommodate the large number of intrusion sensors required, and a separate time data generator is provided in each control unit. In such a case, situations may arise in which analysis of intrusion sensor operation becomes impossible owing to deviation among the time data of the time data generators in the different security control units.

For instance, later analysis of an intrusion becomes extremely difficult when a number of intruders make a coordinated entry through different windows and doors.

A similar problem arises when simultaneous break-ins occur at the premises of two or more tenants who occupy the same building and are separately equipped with their own security control units.

The conventional practice has therefore been to adopt some manual or automated method of calibrating the clocks at the surveillance sites. The manual method generally involves periodic visits by center personnel to calibrate the individual security control units using accurately calibrated clocks or time signals. In the automatic method, time data from a master clock at the security surveillance center is sent to the surveillance system at each monitored site using a surveillance telecommunications circuit and the individual surveillance systems use the received time data to calibrate the clocks of their surveillance devices.

The former method is high in cost, however, because it requires a considerable amount of human labor for the calibration. In addition, time data from the security surveillance center and that from the security surveillance equipment at the individual surveillance sites often do not match perfectly, so that the accuracy of the time analysis of the surveillance data unavoidably remains low.

While the latter method does not suffer any particular problem regarding time analysis so long as the accuracy of the security surveillance center master clock is sufficiently high, the calibration requires a great amount of time when the number of surveillance sites reaches several thousand or more. As such, it is likely to adversely affect security and surveillance operations. Although this disadvantage can be avoided by using a large, high-performance computer system, this leads to another problem of high hardware costs.

A particularly critical situation arises when it becomes necessary to simultaneously calibrate every clock throughout the system at a specific time, such as when adjusting to a seasonal time change or a leap second.

SUMMARY OF THE INVENTION

One object of the present invention is therefore to provide a time calibration method for a security system using sensors that overcomes the aforesaid problems of the prior art.

The present invention achieves this object by using a standard radio signal carrying time data that traces back to a national standard to efficiently conduct extremely accurate time calibration among multiple surveillance devices constituting a security system using sensors by the use of a power-line carrier (PLC) technology.

Specifically, the present invention provides a time calibration method for a security system using sensors that enables time calibration of clocks of multiple surveillance devices used by the security system using sensors, the method comprising: a step of installing a receiver for receiving standard time data in at least one of the multiple surveillance devices of the security system using sensors, and a step of sending the standard time data received by the receiver over a distribution line to required surveillance devices not equipped with receivers.

The receiver is preferably installed in the surveillance device in the environment enabling best reception of the standard time data. The surveillance device equipped with the receiver is configured to send the standard time data periodically or at appropriately set times, whereby the multiple surveillance devices can share identical and accurate time data.

DESCRIPTION OF THE PREFERRED EMBODIMENT

Figure 1:
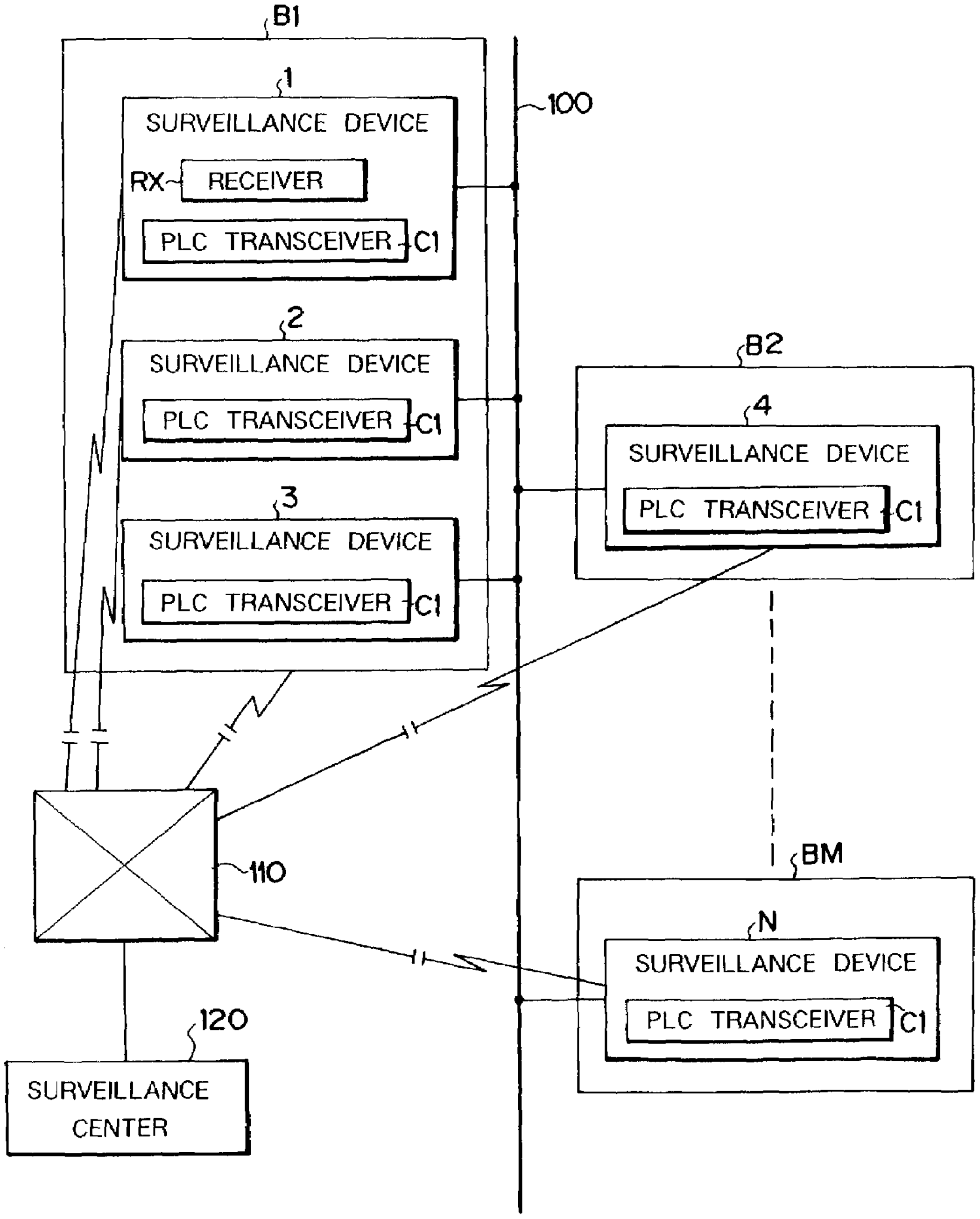
FIG. 1 is a system diagram showing an embodiment of a security system using sensors configured to conduct time calibration in accordance with the present invention.

FIG. 1 is a system diagram showing an embodiment of a security system using sensors configured to conduct time calibration in accordance with the present invention. The symbols 1, 2, . . . N in FIG. 1 designate surveillance devices installed in the same commercial power supply block. As shown in the drawing, the surveillance devices 1–N are installed in buildings B1, B2, . . . BM, which are factories, offices, supermarkets and other such facilities to be monitored by the security system. Reference numeral 100 designates a distribution line for supplying commercial ac 100 V electric power to buildings. The surveillance devices 1–N are supplied with the power they require from the distribution line 100. It should be noted, however, that the power source for the surveillance devices 1–N need not necessarily be the distribution line 100 but can instead be a battery or the like.

The surveillance devices 1–N are connected to a surveillance center 120 through a public telephone circuit network 110 used for sending and receiving required data.

In order to enable the multiple surveillance devices 1–N encompassed by the security system using sensors to share accurate time data, the surveillance device 1 is equipped with a receiver RX for receiving wirelessly transmitted standard time data. The surveillance device 1 can continually utilize the standard time data received by the receiver RX. In addition, the receiver RX is configured to send the standard time data it receives through the distribution line 100 to the surveillance devices 2–N at appropriate times. The sending and receiving of the standard time data is conducted using a PLC technology. Each of the surveillance devices 1–N is therefore equipped with a PLC transceiver C1 for data communications utilizing PLC.

Figure 2:
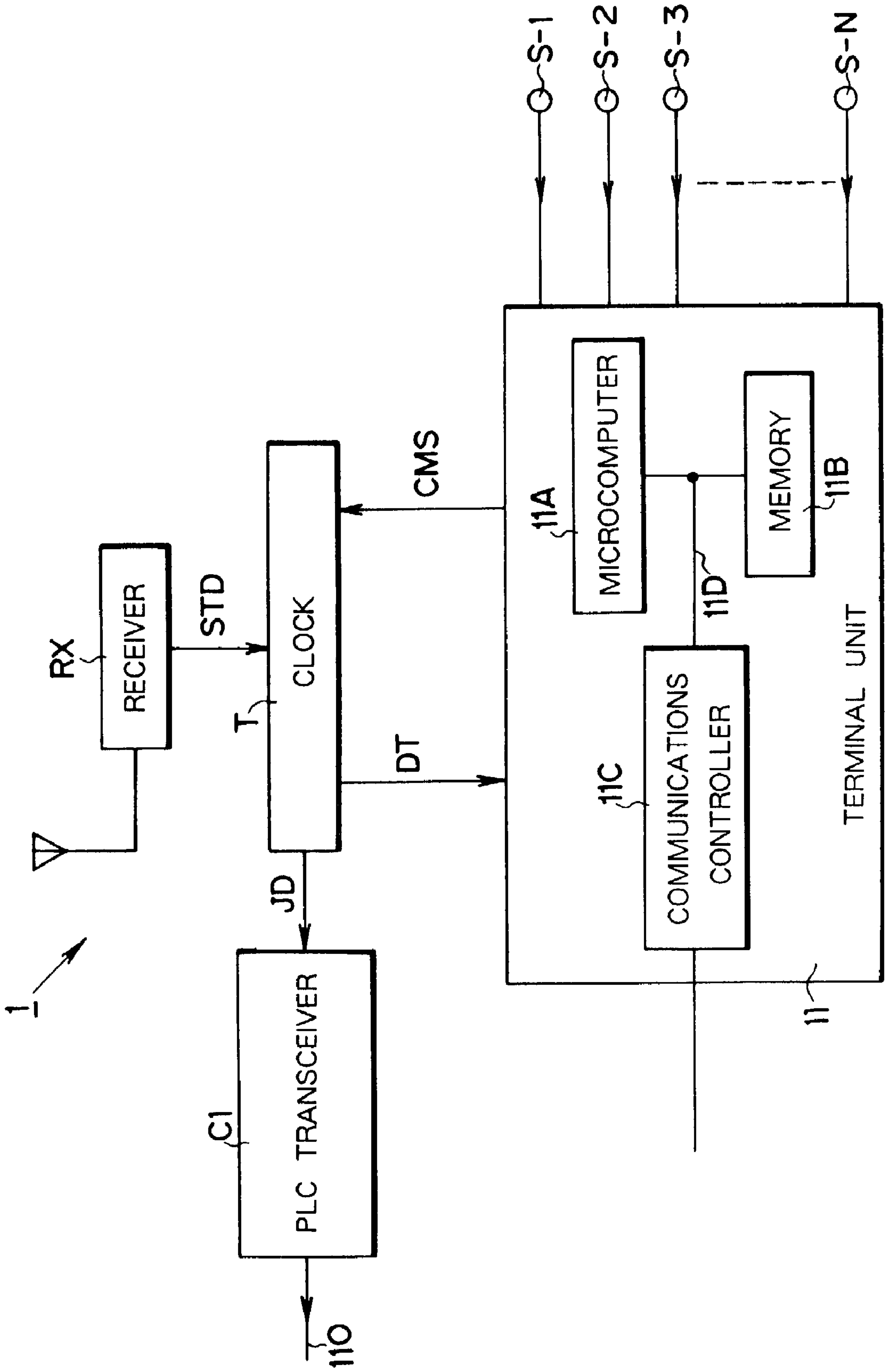
FIG. 2 is a detailed block diagram of a surveillance device shown in FIG. 1.

FIG. 2 is a detailed block diagram of the surveillance device 1 shown in FIG. 1. The surveillance device 1 includes a terminal unit 11 equipped with multiple intrusion sensors S-1–S-N installed at windows, doors, rooms etc. in the demarcated security zone of the building B1 and with a microcomputer 11A that receives and processes the output signals of the intrusion sensors S-1–S-N, and also includes a clock T.

The terminal unit 11 also has a memory 11B and communications controller 11C. The microcomputer 11A, memory 11B and communications controller 11C are interconnected by a data bus 11D. The communications controller 11C is connected to the public telephone circuit network 110, which it uses to exchange data required for security surveillance between the surveillance device 1 and the exterior.

The clock T is a time data generator constituted as a crystal clock, i.e., a clock that measures time using a crystal oscillator. The clock T outputs time data DT indicating the time at that instant. The time data DT is sent to the terminal unit 11.

The terminal unit 11 is responsive to the time data DT and the output signals of the intrusion sensors S-1–S-N. When any of the intrusion sensors S-1–S-N produces a signal, the terminal unit 11 adds the time data DT at that time to the output data from the sensor producing the signal and stores the combined data in the memory 11B of the terminal unit 11. This process is repeated successively for successive sensor signals. Thus when it is later desired to check how and when each of the intrusion sensors S-1–S-N operated, this can be accomplished by reading the pertinent data from the memory 11B. The entry and escape routes of the intruder(s) can therefore be analyzed with good accuracy.

In order to ensure that this analysis can be performed with split second accuracy, the receiver RX provided in the surveillance device 1 is required to be one that can receive a standard radio signal that traces back to a national standard and extract highly accurate standard time data STD from the received signal.

Figure 3:
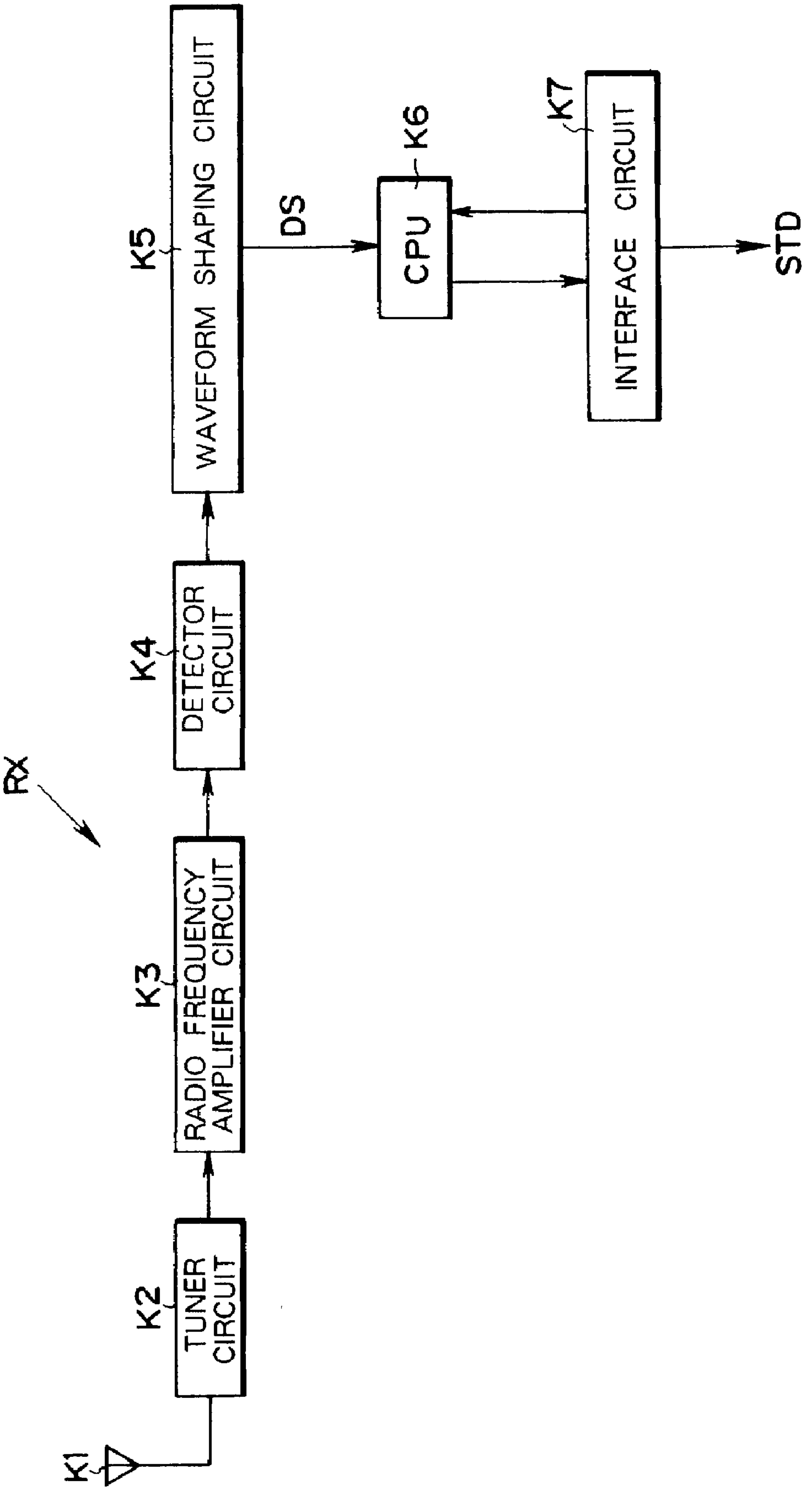
FIG. 3 is a block diagram showing the configuration of a receiver shown in FIG. 2.

FIG. 3 is a block diagram showing the configuration of the receiver RX. Reference symbol K1 in FIG. 3 designates an antenna; K2 a tuner for tuning to a standard radio signal; K3 a radio frequency amplifier for amplifying the weak standard radio signal selected by the tuner K2; K4 a detector for demodulating the standard radio signal to extract the standard time data signal component thereof; and K5 a waveform shaping circuit that produces a digital signal DS representing the standard time.

The digital signal DS is forwarded to a microprocessor (CPU) K6 that processes it to produce the standard time data STD representing the standard time carried by the received standard radio signal. The standard time data STD is sent to the clock T through an interface K7. The clock T uses the standard time data STD received from the receiver RX to perform a time calibration operation. The time calibration is performed by overwriting the time data obtained in the clock T with the standard time data STD.

The time calibration in the clock T is carried out in response to a time calibration command signal CMS received from the terminal unit 11 (FIG. 2). The timing of the output of the time calibration command signal CMS from the terminal unit 11 can be appropriately set as desired. The mechanical security system of this embodiment is programmed to output the time calibration command signal CMS once an hour. However, the time interval between outputs can set to any period desired, such as every hour on the hour, once every two hours or once every three hours.

When time calibration is performed in the clock T, the clock T outputs substation calibration data JD containing the time calibration command signal CMS and the standard time data STD to the PLC transceiver C1. The PLC transceiver C1 in turn outputs the substation calibration data JD onto the distribution line 100.

The surveillance devices 2–N are equipped with PLC transceivers C1 identical to that of the surveillance device 1 (see FIG. 1). In the surveillance devices 2–N, which are not equipped with receivers RX, the substation calibration data JD is received by the associated PLC transceivers C1. As a result, the clocks of the surveillance devices 2–N are time-calibrated.

Figure 4:
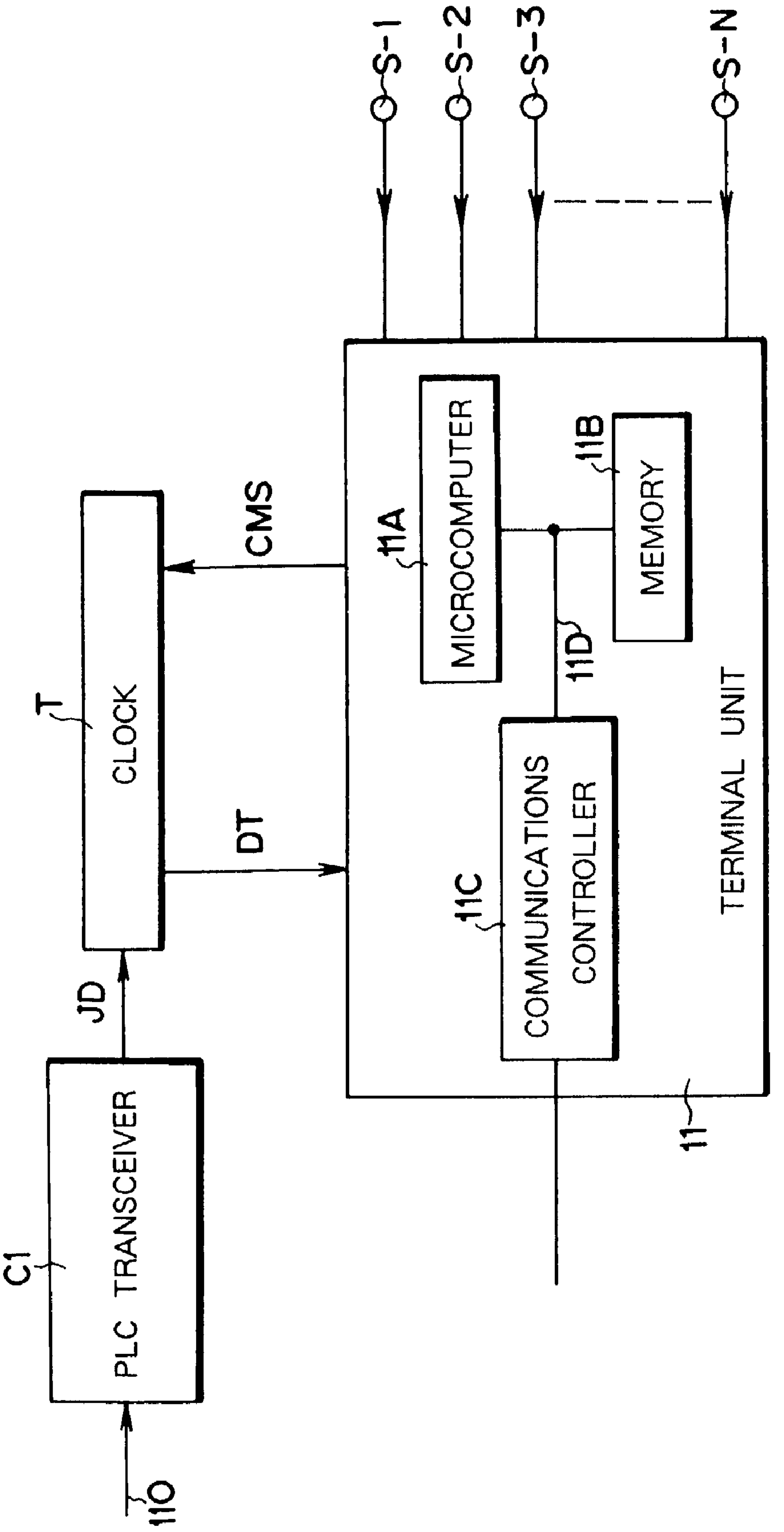
FIG. 4 is a detailed block diagram of a surveillance device not equipped with the receiver shown in FIG. 1.

FIG. 4 is a detailed block diagram of a surveillance device 2 not equipped with the receiver RX shown in FIG. 1. The surveillance device 2 is what is obtained by removing the receiver RX from the surveillance device 1 of FIG. 2. As the remaining constituents of the surveillance device 2 shown in FIG. 4 are identical to those of the surveillance device 1, they are assigned the same reference symbols as those of FIG. 2 and will not be explained again here.

The PLC transceiver C1 of the surveillance device 2 receives the substation calibration data JD sent from the surveillance device 1 via the distribution line 100 and forwards it to the associated clock T. The clock T then performs time calibration based on the time calibration command signal CMS and standard time data STD contained in the substation calibration data JD. This time calibration operation is carried out in exactly the same way as that explained with reference to FIG. 2. As a result, the clock T in the surveillance device 2 can supply the associated terminal unit 11 with very accurate time data DT.

The surveillance devices 3–N are identical is structure to the surveillance device 2 described above with reference to FIG. 4. The surveillance devices 3–N can therefore also continually acquire accurate time data DT, meaning that all of the surveillance devices 1–N can share the same accurate time data. As will be understood from the foregoing explanation, the receiver RX provided in the surveillance device 1 is the only one required and no receiver RX needs be installed in any of the surveillance devices 2–N. From this it follows that only the surveillance device 1 needs to be installed at a location where it can easily receive the standard time data, such as near a window, an the other surveillance devices 2–N can be safely installed at locations that radio signals cannot reach, such as in a basement. Freedom in deploying the surveillance devices is therefore markedly upgraded.

Since all of the surveillance devices 1–N share the same accurate time data, the operation of the intrusion sensors S-1–S-N can be analyzed with split second accuracy. Moreover, as the time calibration can be optimally performed automatically, labor costs for time calibration can be substantially eliminated and system operating cost markedly reduced.

Owing to the fact that time calibration can be performed at any time by utilizing a standard radio signal, calibration of time discrepancy due to introduction of daylight saving time, return to standard time and insertion of a leap second can be automatically and almost instantaneously corrected in a single operation. Momentary degradation of system performance can therefore be prevented when time errors tend to arise owing to such events. The corollary is that maintenance costs can also be reduced.

On the other hand, when the security system using sensors is installed in association with an automatic business hour system, the reliability of the business hour system can be upgraded because the opening and closing times can be controlled with very high accuracy.

According to the time calibration method for a security system using sensors of the present invention, a receiver for receiving standard time data is installed in at least one of multiple surveillance devices of the security system using sensors and the standard time data received by the receiver is sent over a distribution line to required surveillance devices not equipped with receivers. By this, extremely accurate time calibration can be efficiently performed among the multiple surveillance devices using a power-line carrier (PLC) technology. The time data generating means of the surveillance devices installed in the security system using sensors can therefore be supplied with highly accurate time data. As a result, all of the surveillance devices are able to share the same accurate time data, so that analysis of intrusion sensor operation can be performed with split second accuracy. Moreover, since the time calibration can be optimally performed automatically, labor costs for time calibration can be substantially eliminated and system operating cost markedly reduced.

Owing to the fact that time calibration can be performed at any time by utilizing a standard radio signal, calibration of time discrepancy due to introduction of daylight saving time, return to standard time and insertion of a leap second can be automatically and almost instantaneously corrected in a single operation. Momentary degradation of system performance can therefore be prevented when time errors tend to arise owing to such events. The corollary is that maintenance costs can also be reduced.

On the other hand, when the security system using sensors is installed in association with an automatic business hour system, the reliability of the business hour system can be upgraded because the opening and closing times can be controlled with very high accuracy.

What is claimed is:

1. A time calibration method for a security system using sensors that enables time calibration of clocks of multiple surveillance devices used by the security system to identify the time of occurrence of a sensed event, the method comprising:

a step of receiving standard time data from a time source external to said security system in at least one of the multiple surveillance devices of the security system;

a step of sending the standard time data received over a distribution line to other surveillance devices for calibrating each clock in said surveillance devices; and a step of storing output data from a sensor with a calibrated time clock signal.

2. A time calibration method as claimed in claim 1, wherein each of said surveillance devices has a power-line carrier transceiver and the standard time data is sent through the power-line carrier transceiver to the other surveillance devices.

3. A time calibration method as claimed in claim 1, wherein in the surveillance device the time data and an output data from the corresponding sensors are stored in a memory.

4. A time calibration method as claimed in claim 1, wherein a time calibration is performed by overwriting the time data of the clock with the standard time data.

5. A time calibration method as claimed in claim 2, wherein in the surveillance device the time data and an output data from the corresponding sensors are stored in a memory.

6. A time calibration method as claimed in claim 2, wherein a time calibration is performed by overwriting the time data of the clock with the standard time data.

7. The time calibration method of claim 1, wherein said standard time data is transmitted from a national standard clock to said at least one surveillance device.

* * * * *